US012763428B2

(12) United States Patent
Lee et al.

(10) Patent No.: US 12,763,428 B2
(45) Date of Patent: Oct. 13, 2026

(54) SEPARATOR INCLUDING COATING LAYER CONTAINING HIGH AND LOW DENSITY INORGANIC PARTICLES AND PARTICLE BINDER RESIN AND METHOD FOR MANUFACTURING THE SAME

(71) Applicant: LG ENERGY SOLUTION, LTD., Seoul (KR)

(72) Inventors: Seung-Hyun Lee, Daejeon (KR); Hye-Jin Kwon, Daejeon (KR); Kyung-Ryun Ka, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 718 days.

(21) Appl. No.: 17/921,583

(22) PCT Filed: Oct. 8, 2021

(86) PCT No.: PCT/KR2021/013952
§ 371 (c)(1),
(2) Date: Oct. 26, 2022

(87) PCT Pub. No.: WO2022/075823
PCT Pub. Date: Apr. 14, 2022

(65) Prior Publication Data
US 2023/0170579 A1 Jun. 1, 2023

(30) Foreign Application Priority Data
Oct. 8, 2020 (KR) ........................ 10-2020-0130401

(51) Int. Cl.
*H01M 50/403* (2021.01)
*H01M 50/449* (2021.01)
*H01M 50/46* (2021.01)

(52) U.S. Cl.
CPC ....... *H01M 50/403* (2021.01); *H01M 50/449* (2021.01); *H01M 50/461* (2021.01)

(58) Field of Classification Search
CPC . H01M 50/403; H01M 50/461; H01M 50/449
(Continued)

(56) References Cited

U.S. PATENT DOCUMENTS

2015/0140402 A1* 5/2015 Kim .................... H01M 50/461 429/144
2017/0346062 A1* 11/2017 Wong .................. H01M 50/417
(Continued)

FOREIGN PATENT DOCUMENTS

CN 106935778 A * 7/2017 .......... H01M 50/403
JP 2005-294139 A 10/2005
(Continued)

OTHER PUBLICATIONS

Styrene Butadiene Rubber, 2025, Chemical Book, https://www.chemicalbook.com/ProductChemicalPropertiesCB7476376_EN.htm (Year: 2025).*
(Continued)

*Primary Examiner* — Sean P Cullen
(74) *Attorney, Agent, or Firm* — Birch, Stewart, Kolasch & Birch, LLP

(57) ABSTRACT

A separator including a coating layer on the surface of a porous separator substrate, wherein the coating layer has a porous structure derived from the interstitial volumes between the inorganic particles, and thus the separator has suitable porosity and a sufficient degree of electrolyte retention. Further, since the separator includes the inorganic coating layer on the surface of the porous separator substrate, the separator ensures heat resistance and is prevented from shrinking, even when the internal temperature of a battery is increased. A method for manufacturing a separator
(Continued)

including forming the coating layer and the electrode adhesive portion on the coating layer through a single step using the density of inorganic particles and that of binder resin particles, and thus has an advantage in terms of convenience of processing.

12 Claims, 1 Drawing Sheet

(58) Field of Classification Search
USPC .......................................... 429/144, 251, 254
See application file for complete search history.

(56) References Cited

U.S. PATENT DOCUMENTS

| | | | | |
|---|---|---|---|---|
| 2018/0233725 | A1 | 8/2018 | Yasuda et al. | |
| 2019/0020008 | A1 * | 1/2019 | Kim | H01M 50/446 |
| 2020/0350546 | A1 * | 11/2020 | Sung | H01M 50/451 |

FOREIGN PATENT DOCUMENTS

| | | | | | |
|---|---|---|---|---|---|
| JP | 2007-272131 | A | | 10/2007 | |
| JP | 2016-119316 | A | | 6/2016 | |
| JP | 2018-147578 | A | | 9/2018 | |
| JP | 2018-530860 | A | | 10/2018 | |
| JP | 2019-169422 | A | | 10/2019 | |
| KR | 10-2012-0136515 | A | | 12/2012 | |
| KR | 10-1351700 | B1 | | 1/2014 | |
| KR | 10-2014-0112384 | A | | 9/2014 | |
| KR | 10-2015-0069781 | A | | 6/2015 | |
| KR | 10-1541473 | B1 | | 8/2015 | |
| KR | 10-1745631 | B1 | | 6/2017 | |
| KR | 10-2017-0112250 | A | | 10/2017 | |
| KR | 10-2017-0129125 | A | | 11/2017 | |
| KR | 10-2017-0131404 | A | | 11/2017 | |
| KR | 10-2018-0022670 | A | | 3/2018 | |
| KR | 10-2018-0023878 | A | | 3/2018 | |
| KR | 20190110249 | A | * | 9/2019 | H01M 10/052 |
| KR | 10-2020-0051370 | A | | 5/2020 | |
| KR | 10-2020-0078416 | A | | 7/2020 | |
| KR | 10-2020-0089995 | A | | 7/2020 | |
| KR | 10-2020-0107406 | A | | 9/2020 | |
| WO | WO 2017/002366 | A1 | | 1/2017 | |
| WO | WO-2020096310 | A1 | * | 5/2020 | H01M 50/443 |

OTHER PUBLICATIONS

Potassium Titanate, 2025, Chemical Book, https://www.chemicalbook.com/ChemicalProductProperty_EN_CB8313911.htm (Year: 2025).*

Aluminum Oxide, 2025, Chemical Book, https://www.chemicalbook.com/ProductChemicalPropertiesCB9853056_EN.htm (Year: 2025).*

National Center for Biotechnology Information. PubChem Compound Summary for CID 73981, Magnesium Hydroxide. https://pubchem.ncbi.nlm.nih.gov/compound/Magnesium-Hydroxide. Accessed Jul. 25, 2025. (Year: 2025).*

National Center for Biotechnology Information. PubChem Compound Summary for CID 9989226, Aluminum Oxide. https://pubchem.ncbi.nlm.nih.gov/compound/Alumina. Accessed Jul. 25, 2025. (Year: 2025).*

Chemical Book, Sodium polyacrylate, https://www.chemicalbook.com/ChemicalProductProperty_EN_CB9741267.htm. Accessed Jul. 25, 2025. (Year: 2025).*

Poly(acrylic acid), Chemical Book, https://www.chemicalbook.com/ChemicalProductProperty_EN_CB8708560.htm (Year: 2025).*

Zirconium Oxide, MatWeb, https://www.matweb.com/search/datasheet.aspx?MatGUID=0742ddaddf80467fb6532e025c694e89&ckck=1 (Year: 2025).*

Aluminum Nitride, MatWeb, https://www.matweb.com/search/DataSheet.aspx?MatGUID=6dae008cedf645c9a7a142d1400b0e80 (Year: 2025).*

Azo Materials, Alumina—Aluminium Oxide—Al2O3—A Refractory Ceramic Oxide [online], [retrieved on Mar. 5, 2026]. Retrieved from the Internet:< URL: https://www.azom.com/properties.aspx?ArticleID=52> (Year: 2026).*

Azo Materials, Magnesia—Magnesium Oxide (MgO) Properties & Applications [online] [retrieved on Mar. 5, 2026]. Retrieved from the Internet:< URL: https://www.azom.com/properties.aspx?ArticleID=54> (Year: 2026).*

Extended European Search Report for European Application No. 21878073.2, dated Feb. 5, 2025.

* cited by examiner

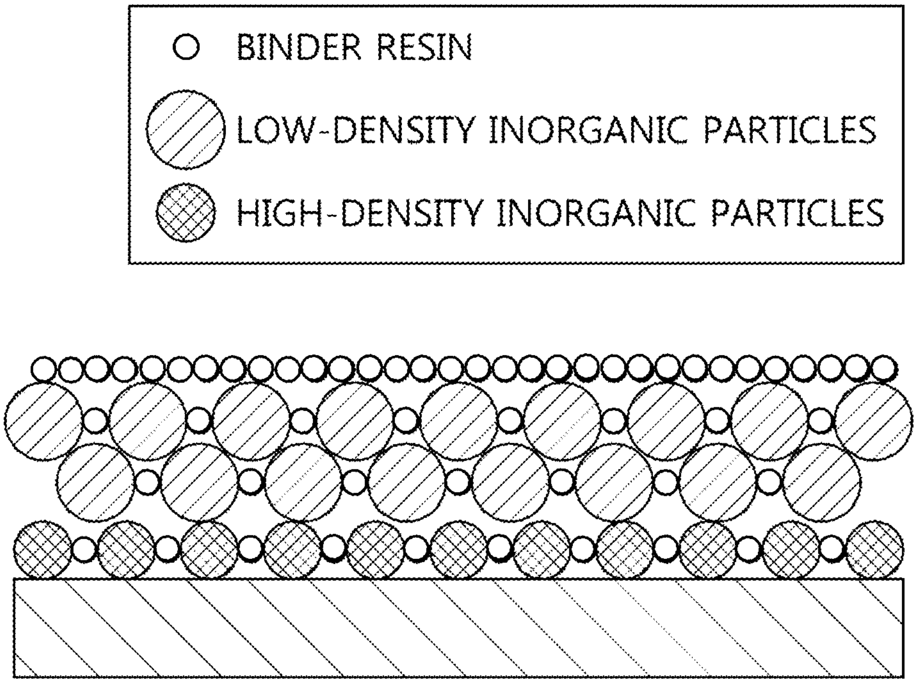
BINDER RESIN
LOW-DENSITY INORGANIC PARTICLES
HIGH-DENSITY INORGANIC PARTICLES

SEPARATOR INCLUDING COATING LAYER CONTAINING HIGH AND LOW DENSITY INORGANIC PARTICLES AND PARTICLE BINDER RESIN AND METHOD FOR MANUFACTURING THE SAME

TECHNICAL FIELD

The present application claims priority to Korean Patent Application No. 10-2020-0130401 filed on Oct. 8, 2020 in the Republic of Korea. The present disclosure relates to a separator for an electrochemical device showing low resistance and high adhesion to an electrode, and a method for manufacturing the same.

BACKGROUND ART

A lithium secondary battery is an energy storage device which has a fundamental structure of positive electrode/negative electrode/separator/electrolyte, and is an energy storage device which can be charged/discharged through reversible conversion between chemical energy and electrical energy and shows high energy density. Such lithium secondary batteries are used widely for compact electronic devices, such as cellular phones, notebook computers, or the like. Recently, application of lithium secondary batteries has been extended rapidly to hybrid electric vehicles (HEV), plug-in electric vehicles (plug-in EV), electric bikes (e-bikes) and energy storage systems (ESS) as a countermeasure to environmental problems, high oil price, energy efficiency and energy storage.

A lithium-ion secondary battery is a stable electrochemical device insulated by a separator. However, it is likely that a short-circuit between a positive electrode and a negative electrode occurs due to an internal or external abnormal phenomenon or impact to cause heating and explosion of the lithium-ion secondary battery. Therefore, securement of the thermal/chemical safety of a separator as an insulator is an important consideration.

A polyolefin-based separator used frequently in commercialized lithium secondary batteries is a porous film that functions to provide pores as lithium-ion channels, while preventing an electrical short-circuit between a positive electrode and a negative electrode, and uses polyethylene or polypropylene as a main ingredient.

In general, a polyolefin-based porous separator obtained through a film orientation process fundamentally cannot avoid a change in volume, such as shrinking or melting, when the temperature of a battery is increased to a high temperature of 100° C. or higher due to internal or external stimuli, which may result in explosion caused by an electrical short-circuit between a positive electrode and a negative electrode. In addition, explosion of a battery caused by an internal short circuit may occur, when a separator is broken due to dendrite growth in the battery. To inhibit such heat shrinking caused by high temperature and battery instability caused by dendrite, there has been suggested a separator including a porous separator substrate, either surface or both surfaces of which are coated with inorganic particles and a binder so that the inorganic particles may impart a function of inhibiting the shrinkage of the substrate and the inorganic coating layer may provide the separator with enhanced safety.

Korean Patent Publication No. 10-0775310 discloses a method for manufacturing a porous separator having an organic/inorganic coating layer formed by coating slurry (PVDF-CTFE/$BaTiO_3$ or PVDF-CTFE/$Al_2O_3$) containing a binder resin and inorganic particles in an organic solvent. Such slurry allows interconnection between a porous substrate and an inorganic coating layer, and among the inorganic particles in the inorganic coating layer. The separator obtained by the method can resist shrinking caused by heat emission and external physical impact events, while not losing such interconnection, during the assembly and operation of a battery.

However, in this case, the binder solution dissolved in the organic solvent may infiltrate into the pores of the porous substrate, and thus a sufficiently large amount of binder is required to realize sufficient adhesion between the inorganic particles and the porous substrate surface, or the binder solution may undergo gelling as the solvent evaporates, which may result in generation of a solvent-impermeable space to cause an unbalance in the inorganic coating layer and degradation of battery characteristics. In addition, when the binder concentration in the slurry is increased, the slurry shows significantly high viscosity, thereby making it difficult to form an organic/inorganic composite layer as a thin film, and a high temperature may be required during a drying step. When the slurry viscosity is maintained at a low level, adhesion to the porous substrate or adhesion of inorganic particles among themselves may be decreased to cause easy detachment of the inorganic particles. For these reasons, a binder has been used frequently in the form of an emulsion or suspension in which the binder is dispersed with a predetermined size. In some cases, a binder dispersed in an organic solvent (organic dispersion) with a predetermined size has been used. Particularly, when the inorganic particles are coated by using a binder dispersed in an aqueous solvent (aqueous dispersion) with a predetermined size, many eco-friendly and processing advantages are provided, resulting in high preference. However, there is a problem in that use of such a binder dispersed in an aqueous solvent alone cannot realize sufficient adhesion of the inorganic particles among themselves, or between the inorganic particles and the porous substrate.

Meanwhile, as a method for improving the adhesion between a porous substrate and a coating layer, Korean Laid-Open Patent No. 10-2012-0052100 discloses a method for manufacturing a coated separator having two coating layers, which includes casting slurry containing styrene butadiene rubber (SBR) and carboxymethyl cellulose (CMC) dissolved in acetone as an organic solvent onto a polyethylene porous film to form an organic/inorganic composite layer, and electrospinning a polymer solution thereon. However, when the organic/inorganic composite layer is formed by such a method, it is not possible to avoid the above-mentioned problems related with the use of an organic solvent. In addition, a method for manufacturing a tri-layer coated separator by carrying out spinning on the inorganic coating layer has been disclosed in order to solve the problem of low adhesion to the substrate and detachment of the inorganic particles. However, in this case, formation of a film through spinning has a difficulty in overcoming a limitation in controlling the thickness of a coating layer, as viewed from the requirement of thin filming of a separator. In addition, the method provides pores with low uniformity. Thus, when the separator is applied to a battery, electric current cannot flow with uniform distribution but is localized at a specific portion to cause partial heat emission, deterioration and explosion. As a result, it is not possible to provide a fundamental technical solution for an organic/inorganic coated separator.

DISCLOSURE

Technical Problem

The present disclosure is designed to solve the problems of the related art, and therefore the present disclosure is directed to providing a separator for a secondary battery which shows low resistance, suitable porosity and a sufficient degree of electrolyte retention, while ensuring heat resistance. The present disclosure is also directed to providing a method for manufacturing a separator for a secondary battery having the above-mentioned characteristics. These and other objects and advantages of the present disclosure may be realized by the means shown in the appended claims and combinations thereof.

Technical Solution

According to the first embodiment of the present disclosure, there is provided a separator for an electrochemical device, including a porous separator substrate and a coating layer on at least one surface of the porous separator substrate, wherein the coating layer includes high-density inorganic particles, low-density inorganic particles and a particle-type binder resin, the ratio of the density of the particle-type binder resin to the density of the high-density inorganic particles (density of binder resin/density of high-density inorganic particles) is equal to or more than 0.2 and less than 0.33, and the ratio of the density of the particle-type binder resin to the density of the low-density inorganic particles (density of binder resin/density of low-density inorganic particles) is ranges from 0.33 to 0.5.

According to the second embodiment of the present disclosure, there is provided the separator for an electrochemical device as defined in the first embodiment, wherein the coating layer includes a first layer adjacent to the porous_separator substrate, a second layer on the surface of the first layer and an electrode adhesive portion on the surface of the second layer, the first layer includes an amount of the high-density inorganic particles at that is higher than an amount of the high-density inorganic particles present in the second layer or the electrode adhesive portion, the second layer includes an amount of the low-density inorganic particles that is higher than an amount of the low-density inorganic particles present in the first layer or the electrode adhesive portion, and the electrode adhesive portion includes an amount of the particle-type binder resin that is higher than an amount of the particle-type binder resin present in the first layer or the second layer.

According to the third embodiment of the present disclosure, there is provided the separator for an electrochemical device as defined in the first embodiment, wherein the coating layer has pores from the interstitial volumes formed between the high-density inorganic particles, the low-density inorganic particles and the particle-type binder resin.

According to the fourth embodiment of the present disclosure, there is provided the separator for an electrochemical device as defined in any one of the first to the third embodiments, wherein the particle-type binder resin has an average particle diameter ($D_{50}$) of 300 nm to 500 nm.

According to the fifth embodiment of the present disclosure, there is provided the separator for an electrochemical device as defined in any one of the first to the fourth embodiments, wherein the low-density inorganic particles have an average particle diameter ($D_{50}$) in a range of 500 nm to 1,000 nm, the high-density inorganic particles have an average particle diameter ($D_{50}$) in a range of 300 nm to 700 nm, and the high-density particles have a smaller average particle diameter ($D_{50}$) as compared to the average particle diameter ($D_{50}$) of the low-density particles.

According to the sixth embodiment of the present disclosure, there is provided the separator for an electrochemical device as defined in any one of the first to the fifth embodiments, wherein the particle-type binder resin includes an acrylic binder resin.

According to the seventh embodiment of the present disclosure, there is provided the separator for an electrochemical device as defined in any one of the first to the sixth embodiments, wherein the low-density inorganic particles include at least one selected from aluminum hydroxide ($Al(OH)_3$) and $Mg(OH)_2$.

According to the eighth embodiment of the present disclosure, there is provided the separator for an electrochemical device as defined in any one of the first to the seventh embodiments, wherein the high-density inorganic particles include at least one selected from boehmite (AlOOH), alumina ($Al_2O_3$) and $BaTiO_3$.

According to the ninth embodiment of the present disclosure, there is provided the separator for an electrochemical device as defined in any one of the first to the eighth embodiments, wherein an amount of the low-density particles is 40 wt % to 80 wt % based on 100 wt % of the inorganic particles in the coating layer.

According to the tenth embodiment of the present disclosure, there is provided a method for manufacturing the separator as defined in any one of the first to the ninth embodiments, including: applying an aqueous slurry for forming a coating layer to at least one surface of a porous separator substrate, followed by drying, wherein the aqueous slurry includes a particle-type binder resin, low-density inorganic particles and high-density inorganic particles and water as a solvent, and wherein the coating layer comprises a tri-layer structure comprising_a first layer, a second layer and an electrode adhesive portion are formed by a difference in sedimentation rate, while the aqueous slurry is dried after being applied to the porous separator substrate.

According to the eleventh embodiment of the present disclosure, there is provided the method for manufacturing the separator as defined in the tenth embodiment, wherein the aqueous slurry has a viscosity of 100 cp or less.

Advantageous Effects

In the separator according to an embodiment of the present disclosure, an electrode adhesive portion having a high content of binder is formed on the surface of the separator to provide increased binding force to an electrode and improved processability during the manufacture of a battery. Thus, the separator and the electrode are in close contact with each other to prevent generation of a gap, thereby providing an effect of improving resistance characteristics. In addition, the separator according to an embodiment of the present disclosure includes an inorganic coating layer disposed on the surface of a porous substrate, wherein the inorganic coating layer has a porous structure derived from the interstitial volumes among the inorganic particles, and thus the separator has suitable porosity and a sufficient degree of electrolyte retention. Further, since the separator according to an embodiment of the present disclosure includes the inorganic coating layer on the surface of the porous substrate, the separator ensures heat resistance and is prevented from shrinking, even when the internal temperature of a battery is increased. Meanwhile, the method for manufacturing a separator for an electrochemical device according to an embodiment of the present disclosure includes forming the inorganic coating layer and the electrode adhesive portion disposed on the inorganic coating layer through a single step using the density of inorganic particles and that of binder resin particles, and thus has an advantage in terms of convenience of processing.

DESCRIPTION OF DRAWINGS

The accompanying drawings illustrate a preferred embodiment of the present disclosure and together with the foregoing disclosure, serve to provide further understanding of the technical features of the present disclosure, and thus, the present disclosure is not construed as being limited to the drawing.

The Figure is a schematic sectional view illustrating the separator according to an embodiment of the present disclosure, wherein a coating layer is formed on the surface of a porous substrate, and an electrode adhesive portion having a high binder resin content is formed on the surface of the inorganic coating layer.

BEST MODE

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation. Therefore, the description proposed herein is just a preferable example for the purpose of illustrations only, not intended to limit the scope of the disclosure, so it should be understood that other equivalents and modifications could be made thereto without departing from the scope of the disclosure.

Throughout the specification, the expression 'a part includes an element' does not preclude the presence of any additional elements but means that the part may further include the other elements.

As used herein, the terms 'about', 'substantially', or the like, are used as meaning contiguous from or to the stated numerical value, when an acceptable preparation and material error unique to the stated meaning is suggested, and are used for the purpose of preventing an unconscientious invader from unduly using the stated disclosure including an accurate or absolute numerical value provided to help understanding of the present disclosure.

As used herein, the expression 'A and/or B' means 'A, B or both of them'.

Specific terms used in the following description are for illustrative purposes and are not limiting. Such terms as 'right', 'left', 'top surface' and 'bottom surface' show the directions in the drawings to which they are referred. Such terms as 'inwardly' and 'outwardly' show the direction toward the geometrical center of the corresponding apparatus, system and members thereof and the direction away from the same, respectively.

The separator for an electrochemical device according to an embodiment of the present disclosure is used as a separator of an electrochemical device, preferably, a secondary battery, and is an element contained in a unit cell. The secondary battery is a rechargeable battery and has a concept covering a lithium-ion battery, nickel-cadmium battery, nickel-hydrogen battery, or the like.

In one aspect of the present disclosure, there is provided a separator including a porous separator substrate, and an inorganic coating layer formed on at least one surface of the separator substrate, wherein the inorganic coating layer has an adhesive portion formed on the surface thereof to a predetermined thickness. The adhesive portion refers to a portion having a higher content of binder resin as compared to the other portions of the inorganic coating layer, and functions to provide binding force to an electrode which it faces.

The separator substrate means a porous ion-conducting barrier which allows ions to pass therethrough while interrupting an electrical contact between a negative electrode and a positive electrode, and has a plurality of pores formed therein. The pores are interconnected so that gases or liquids may pass from one surface of the substrate to the other surface of the substrate.

Materials forming the separator substrate may be any organic materials or inorganic materials having electrical insulation property. Particularly, with a view to imparting a shut-down function to a substrate, it is preferred to use a thermoplastic resin as a material forming the substrate. Herein, the term 'shut-down function' means a function of preventing thermal runaway of a battery by allowing a thermoplastic resin to be molten so that the pores of the porous substrate may be closed and ion conduction may be interrupted, when the battery temperature is increased. As a thermoplastic resin, a thermoplastic resin having a melting point less than 200° C. is suitable, polyolefin being particularly preferred.

In addition to polyolefin, the thermoplastic resin may further include at least one polymer resin selected from polyethylene terephthalate, polybutylene terephthalate, polyacetal, polyamide, polycarbonate, polyimide, polyetherether ketone, polyether sulfone, polyphenylene oxide, polyphenylene sulfide and polyethylene naphthalene.

According to an embodiment of the present disclosure, the separator substrate includes the above-mentioned polymer materials and may be provided in the form of a non-woven web and/or porous polymer film, which may include such materials alone or in combination.

According to an embodiment of the present disclosure, the separator substrate may be any porous polymer substrate, as long as it is a planar porous polymer film or non-woven web used for an electrochemical device. For example, an insulating thin film showing high ion permeability and mechanical strength and generally having a pore diameter of 10-100 nm and a thickness of 3-20 μm or 4-15 μm may be used. Meanwhile, the separator substrate according to an embodiment of the present disclosure may have a porosity of 30-70% preferably.

The inorganic coating layer may include inorganic particles and a particle-type binder resin. The Figure is a schematic view illustrating a coating layer formed on the surface of a porous substrate, wherein the coating layer includes a particle-type binder resin, low-density inorganic particles and high-density inorganic particles, stacked in a layered structure. As shown in the Figure, the top surface of the coating layer has a sectional structure which includes electrode adhesive portion having a predetermined thickness and predominantly containing the particle-type binder resin. As described hereinafter, the coating layer is formed by using aqueous slurry prepared by introducing the inorganic particles and particle-type binder resin into an aqueous solvent, and a multi-layer structure is formed by using a difference in density of the solid ingredients (the remaining ingredients of the slurry except the solvent) contained in the slurry. Herein, the electrode adhesive portion may have a non-uniform thickness throughout the whole surface of the separator.

According to an embodiment of the present disclosure, the inorganic coating layer may include the inorganic particles in an amount of 50 wt % or more, or 65 wt % or more, based on 100 wt % of the inorganic coating layer. Meanwhile, the binder resin is used in an amount of 50 wt % or less, based on 100 wt % of the inorganic coating layer. Meanwhile, according to the present disclosure, the inorganic coating layer includes, as inorganic particles, high-density particles and low-density particles having a lower density as compared to the high-density particles, and the high-density particles are distributed predominantly at the lower portion of the inorganic coating layer, and the low-density particles are distributed predominantly at the upper portion of the inorganic coating layer. Herein, the layer that is in direct contact with the surface of the porous substrate and predominantly containing the high-density particles is referred to as a first layer, and the layer predominantly containing the low-density particles is referred to as a second layer. As used herein, the expression 'predominantly containing/distributed predominantly' means that the corresponding ingredient is present in an amount of 50 wt %, preferably 75 wt %, and more preferably 90 wt %, as compared to the other ingredients. According to an embodiment of the present disclosure, in the distribution of the binder resin particles, high-density inorganic particles and the low-density inorganic particles, the first layer includes the high-density inorganic particles at the highest content, the second layer includes the low-density inorganic particles at the highest content, and the electrode adhesive portion includes the particle-type binder resin at the highest content.

According to the present disclosure, the term 'density' may refer to true density. The true density means density of a portion filled completely with the corresponding ingredient, except a gap between one particle and another particle and open pores. The true density may be determined by the Archimedes method. For example, the true density may be determined by using a true density tester (Gas Pycnometer, G PYC-100, PMI, USA), and the true density value may be obtained by allowing a gas, such as helium, to be adsorbed to a sample, and measuring a change in pressure caused by a decrease in volume of the adsorbed gas. Particularly, the volume (Vc) of a sample chamber to which a sample is introduced and the volume (Vr) of a reference chamber merely functioning to increase the volume are measured. Next, the gas inlet valve is opened and helium gas is introduced to the sample chamber. Then, the equilibrium pressure in the sample chamber becomes P1, and the volume becomes Vc−Vs. Herein, Vs refers to the volume of a sample. After that, an expansion value is opened, and then the new equilibrium pressure becomes P2, and the volume becomes Vc−Vs+Vr. This can be represented by the simple formula of P1(Vc−Vs)=P2(Vc−Vs+Vr). Each of the equilibrium pressures, P1 and P2, is determined by using a pressure transducer, and the volumes, Vc and Vr, of the two chambers are already known. Thus, Vs can be determined with ease. As a result, the true density value can be obtained, since the determined volume of a sample is the volume of a pure sample alone, except all open pores present in the sample.

Meanwhile, the first layer and the second layer include the inorganic particles in combination with the particle-type binder resin, wherein the inorganic particles are bound to one another by the binder resin to form the inorganic coating layer. In addition, the binder resin particles function to provide binding force so that the inorganic coating layer may be bound to the porous substrate.

In other words, according to a preferred embodiment of the present disclosure, the separator includes the separator substrate and the inorganic coating layer formed on at least one surface of the separator substrate, wherein the inorganic coating layer includes the first layer that is in contact with the separator substrate, the second layer formed on the top surface of the first layer and the electrode adhesive portion formed on the top surface of the second layer. The first layer predominantly contains the high-density particles, the second layer predominantly contains the low-density particles having a relatively lower density as compared to the high-density particles, and the electrode adhesive portion predominantly contains the binder resin particles. The density of the binder resin particles is relatively lower than the density of the high-density particles and that of the low-density particles. As described hereinafter, each of the layers is formed by differentiation of layers depending on a degree of sedimentation derived from the density of each type of particles in the slurry for forming an inorganic coating layer, the boundary and ingredients of each layer may not be clearly distinguished, and a main ingredient of one layer may be incorporated to another layer. According to an embodiment of the present disclosure, a predetermined amount of the binder resin particles may be incorporated to the first layer and the second layer, and the inorganic particles may be bound to one another by the incorporated binder resin particles so that the inorganic particles may not be detached from each layer and the layer structure may be retained stably.

According to an embodiment of the present disclosure, the inorganic coating layer has porous properties by the interstitial volumes formed among the binder resin particles, and between the inorganic particles and the binder resin particles. The term 'interstitial volume' means a space defined by particles substantially facing one another in a structure including the particles packed therein.

According to the present disclosure, the ratio (density ratio A) of the density of the binder resin to the density of the high-density inorganic particles (density of binder resin/density of high-density inorganic particles) is equal to or more than 0.2 and less than 0.33, and the ratio (density ratio B) of the density of the binder resin to the density of the low-density inorganic particles (density of binder resin/density of low-density inorganic particles) is 0.33-0.5. When the above-defined ranges are satisfied, different degrees of sedimentation appear in the process for manufacturing a separator so that a porous coating layer having a desired layered structure may be realized.

Meanwhile, according to an embodiment of the present disclosure, within the above-defined density ratio A and density ratio B, the high-density particles may have a density of 2-10 g/cm$^3$, and the low-density particles may have a density of 1-7 g/cm$^3$. In addition, the binder resin may have a density of 0.5-5 g/cm$^3$. However, the density of each type of particles is not limited to the above-mentioned range, as long as it satisfies the above-defined density ratio A and density ratio B.

Meanwhile, according to an embodiment of the present disclosure, the content of the low-density particles may be 40-80 wt % based on 100 wt % of the inorganic particles in the inorganic coating layer. Within the above-defined range, the content of the low-density particles may be 55 wt % or more, or 60 wt % or more. When the content of the low-density particles is relatively higher as exemplified above, the second layer may be formed to have a larger thickness as compared to the first layer, which is advantageous in terms of ensuring high porosity and resistance characteristics.

In addition, the low-density particles may have a particle diameter ($D_{50}$) of 500-1,000 nm, and the high-density particles may have a particle diameter ($D_{50}$) of 300-700 nm. When the low-density particles and the high-density particles satisfy the above-defined range, the size of voids formed among the particles in the first layer becomes smaller than the particle diameter of the low-density particles. Thus, it is possible to prevent the low-density particles from being incorporated to the pores of the first layer, and to realize a desired layered structure with ease. Meanwhile, the particle-type binder resin may have a particle diameter ($D_{50}$) of 300-500 nm, preferably. Due to such a difference in density, the binder resin is predominantly disposed at the top layer as compared to the first layer and/or the second layer. However, the binder resin is smaller than the size of the voids formed in the first layer and the second layer, and thus may be introduced to the first layer and the second layer. Therefore, the binder particles may be disposed in the first layer and the second layer so that the particles in the inorganic coating layer may be bound to one another to retain the outer shape advantageously.

According to the present disclosure, the particle diameter ($D_{50}$) may be defined as particle dimeter at a point of 50% in particle size distribution. According to an embodiment of the present disclosure, the particle diameter ($D_{50}$) may be determined by using the laser diffraction method.

Meanwhile, according to an embodiment of the present disclosure, the second layer may have a larger thickness as compared to the first layer. In other words, it is possible to increase the porosity of the inorganic coating layer by increasing the proportion of the second layer predominantly containing the low-density particles having a larger particle diameter. In addition, the inorganic particles in the first layer have a smaller particle diameter to increase the contact area between the porous substrate and the inorganic coating layer, resulting in an increase in peel force.

According to an embodiment of the present disclosure, the low-density particle may include at least one selected from aluminum hydroxide ($Al(OH)_3$) and $Mg(OH)_2$, and the high-density inorganic particle may include at least one selected from boehmite (AlOOH), alumina ($Al_2O_3$) and $BaTiO_3$. The inorganic particles are not limited to the above-exemplified ingredients, but the above-exemplified composition is advantageous to realization of the above-defined density ratio values.

According to a particular embodiment of the present disclosure, there is no particular limitation in the inorganic particles, as long as they are electrochemically stable and satisfy the above-defined density ranges of the inorganic coating layer. In other words, there is no particular limitation in the inorganic particles that may be used herein, as long as they cause no oxidation and/or reduction in the range (e.g. 0-5 V based on $Li/Li^+$) of operating voltage of an applicable electrochemical device and satisfy the above-defined condition. Non-limiting examples of the inorganic particles include $Al_2O_3$, AlOOH, $Al(OH)_3$, AlN, BN, MgO, $Mg(OH)_2$, $SiO_2$, ZnO, $TiO_2$, $BaTiO_3$ or a mixture thereof.

Meanwhile, according to an embodiment of the present disclosure, the binder resin is not particularly limited, as long as it can be dispersed in an aqueous solvent in the state of particles. Particular examples of the binder resin include, but are not limited to: polyvinylidene fluoride-co-hexafluoropropylene, polyvinylidene fluoride-co-trichloroethylene, polymethyl methacrylate, polyethylhexyl acrylate, polybutyl acrylate, polyacrylonitrile, polyvinyl pyrrolidone, polyvinyl acetate, polyethylene-co-vinyl acetate, polyethylene oxide, polyarylate, cellulose acetate, cellulose acetate butyrate, cellulose acetate propionate, cyanoethylpullulan, cyanoethylpolyvinyl alcohol, cyanoethyl cellulose, cyanoethyl sucrose, pullulan, carboxymethyl cellulose, or the like.

Meanwhile, according to an embodiment of the present disclosure, the inorganic coating layer may have a thickness of 0.01-20 μm based on one surface of the separator substrate.

Hereinafter, the method for forming an inorganic coating layer will be explained.

According to an embodiment of the present disclosure, the separator is obtained by mixing high-density particles, low-density particles and a binder resin with a suitable aqueous solvent to prepare slurry for forming an inorganic coating layer, and then applying the slurry to the surface of a separator substrate, followed by drying. The slurry may be coated by using at least one method selected suitably from dip coating, slot die coating, microgravure coating, wire coating and doctor blade coating. According to an embodiment of the present disclosure, the slurry may have a solid content (the remaining ingredients of the slurry except the solvent) of about 25-40 wt %.

The drying may be carried out at a temperature of 80-100° C., for example, under the condition of convection, such as a convection oven.

The solvent may include an aqueous solvent capable of dispersing a polymer resin, preferably. Particular examples of the aqueous solvent may include water, isopropyl alcohol, propanol, or the like, and such solvents may be used alone or in combination.

As described above, each ingredient shows a different sedimentation rate due to a difference in density, and thus the inorganic coating layer has a layered structure. In other words, the high-density inorganic particles settle first of all on the surface of the separator substrate to form the first layer, and the low-density particles settle thereon to form the second layer. Meanwhile, the binder resin having low density and showing the lowest sedimentation rate is accumulated on the surface of the second layer to form the electrode adhesive portion. Meanwhile, the binder resin having the smallest particle size is introduced to the voids of the second layer and the first layer and functions to impart binding force to each layer.

Meanwhile, according to a particular embodiment of the present disclosure, the slurry preferably has a viscosity of 100 cp or less. When the viscosity is larger than the above-defined range, phase separation caused by a difference in density of the low-density particles, high-density particles and the binder resin particles is not clear, thereby making it difficult to realize a layered structure and to ensure adhesion between an electrode and the separator.

In the method for manufacturing a separator according to the present disclosure, the electrode adhesive portion is formed on the surface of the separator in an integral and non-separable form through a single step using different sedimentation rates of different particles. Thus, the method according to the present disclosure shows high convenience in processing. In addition, the inorganic particles are bound to one another by using the particle-type binder resin, and the interstitial volumes among the inorganic particles are retained as vacant spaces to form pores. Therefore, the inorganic coating layer shows high porosity to provide an effect of improving electrolyte wettability. In addition, the electrode adhesive portion provides increased binding force between an electrode and the separator, and thus the interfacial resistance between the electrode and the separator is reduced.

In another aspect of the present disclosure, there is provided an electrode assembly including the separator interposed between a positive electrode and a negative electrode, and an electrochemical device including the electrode assembly.

According to the present disclosure, the positive electrode includes a positive electrode current collector and a positive electrode active material layer formed on at least one surface of the current collector and containing a positive electrode active material, a conductive material and a binder resin. The positive electrode active material may include any one selected from: layered compounds, such as lithium manganese composite oxide ($LiMn_2O_4$, $LiMnO_2$, etc.), lithium cobalt oxide ($LiCoO_2$) and lithium nickel oxide ($LiNiO_2$), or those compounds substituted with one or more transition metals; lithium manganese oxides such as those represented by the chemical formula of $Li_{1+x}Mn_{2-x}O_4$ (wherein x is 0-0.33), $LiMnO_3$, $LiMn_2O_3$ and $LiMnO_2$; lithium copper oxide ($Li_2CuO_2$); vanadium oxides such as $LiV_3O_8$, $LiV_3O_4$, $V_2O_5$ or $Cu_2V_2O_7$; Ni-site type lithium nickel oxides represented by the chemical formula of $LiNi_{1l-x}M_xO_2$ (wherein M is Co, Mn, Al, Cu, Fe, Mg, B or Ga, and x is 0.01-0.3); lithium manganese composite oxides represented by the chemical formula of $LiMn_{2-x}M_xO_2$ (wherein M is Co, Ni, Fe, Cr, Zn or Ta, and x is 0.01-0.1) or $Li_2Mn_3MO_8$ (wherein M is Fe, Co, Ni, Cu or Zn); $LiMn_2O_4$ in which Li is partially substituted with an alkaline earth metal ion; disulfide compounds; and $Fe_2(MoO_4)_3$; or a mixture of two or more of them.

According to the present disclosure, the negative electrode includes a negative electrode current collector, and a negative electrode active material layer formed on at least one surface of the current collector and containing a negative electrode active material, a conductive material and a binder resin. The negative electrode may include, as a negative electrode active material, any one selected from: lithium metal oxide; carbon such as non-graphitizable carbon or graphite-based carbon; metal composite oxides, such as $Li_xFe_2O_3$ ($0 \le x \le 1$), $Li_xWO_2$ ($0 \le x \le 1$), $Sn_xMe_{1-x}Me'_yO_z$ (Me: Mn, Fe, Pb, Ge; Me': Al, B, P, Si, elements of Group 1, 2 or 3 in the Periodic Table, halogen; $0<x \le 1$; $1 \le y \le 3$; $1 \le z \le 8$); lithium metal; lithium alloy; silicon-based alloy; tin-based alloy; metal oxides, such as SnO, $SnO_2$, PbO, $PbO_2$, $Pb_2O_3$, $Pb_3O_4$, $Sb_2O_3$, $Sb_2O_4$, $Sb_2O_5$, GeO, $GeO_2$, $Bi_2O_3$, $Bi_2O_4$ and $Bi_2O_5$; conductive polymers, such as polyacetylene; Li—Co—Ni type materials; and titanium oxide; or a mixture of two or more of them.

According to an embodiment of the present disclosure, the conductive material may be any one selected from the group consisting of graphite, carbon black, carbon fibers or metal fibers, metal powder, conductive whiskers, conductive metal oxides, activated carbon and polyphenylene derivatives, or a mixture of two or more of such conductive materials. More particularly, the conductive material may be any one selected from natural graphite, artificial graphite, Super-P®, acetylene black, Ketienblack®, channel black, furnace black, lamp black, thermal black, DENKA BLACK®, aluminum powder, nickel powder, zinc oxide, potassium titanate and titanium dioxide, or a mixture of two or more such conductive materials.

The current collector is not particularly limited, as long as it causes no chemical change in the corresponding battery and has high conductivity. Particular examples of the current collector may include stainless steel, copper, aluminum, nickel, titanium, baked carbon, aluminum or stainless steel surface-treated with carbon, nickel, titanium or silver, or the like.

The binder resin may be a polymer used currently for an electrode in the art. Non-limiting examples of the binder polymer include, but are not limited to: polyvinylidene fluoride-co-hexafluoropropylene, polyvinylidene fluoride-co-trichloroethylene, polymethyl methacrylate, polyethylhexyl acrylate, polybutyl acrylate, polyacrylonitrile, polyvinyl pyrrolidone, polyvinyl acetate, polyethylene-co-vinyl acetate, polyethylene oxide, polyarylate, cellulose acetate, cellulose acetate butyrate, cellulose acetate propionate, cyanoethylpullulan, cyanoethylpolyvinyl alcohol, cyanoethyl cellulose, cyanoethyl sucrose, pullulan, carboxymethyl cellulose, or the like.

The electrode assembly prepared as described above may be introduced to a suitable casing, and an electrolyte may be injected thereto to obtain a battery. According to the present disclosure, the electrolyte is a salt having a structure of $A^+B^-$, wherein $A^+$ includes an alkali metal cation such as $Li^+$, $Na^+$, $K^+$ or a combination thereof, and $B^-$ includes an anion such as $PF_6^-$, $BF_4^-$, $Cl^-$, $Br^-$, $I^-$, $ClO_4^-$, $AsF_6^-$, $CH_3CO_2^-$, $CF_3SO_3^-$, $N(CF_3SO_2)_2^-$, $C(CF_2SO_2)_3^-$ or a combination thereof, the salt being dissolved or dissociated in an organic solvent selected from propylene carbonate (PC), ethylene carbonate (EC), diethyl carbonate (DEC), dimethyl carbonate (DMC), dipropyl carbonate (DPC), dimethyl sulfoxide, acetonitrile, dimethoxyethane, diethoxyethane, tetrahydrofuran, N-methyl-2-pyrrolidone (NMP), ethyl methyl carbonate (EMC), gamma-butyrolactone (γ-butyrolactone), ester compounds and mixtures thereof. However, the present disclosure is not limited thereto.

In addition, the present disclosure provides a battery module which includes a battery including the electrode assembly as a unit cell, a battery pack including the battery module, and a device including the battery pack as an electric power source. Particular examples of the device include, but are not limited to: power tools driven by the power of an electric motor; electric cars, including electric vehicles (EV), hybrid electric vehicles (HEV), plug-in hybrid electric vehicles (PHEV), or the like; electric two-wheeled vehicles, including E-bikes and E-scooters; electric golf carts; electric power storage systems; or the like.

Examples will be described more fully hereinafter so that the present disclosure can be understood with ease. The following examples may, however, be embodied in many different forms and should not be construed as limited to the exemplary embodiments set forth therein. Rather, these exemplary embodiments are provided so that the present disclosure will be thorough and complete, and will fully convey the scope of the present disclosure to those skilled in the art.

Example 1

First, alumina ($Al_2O_3$, $D_{50}$: 500 nm, density: 4 g/cm$^3$) as high-density particles and $Al(OH)_3$ ($D_{50}$: 800 nm, density: 2.4 g/cm$^3$) as low-density particles were introduced to water, styrene acrylate (gel content 98%, pH 3, particle diameter ($D_{50}$: 380 nm)) as a binder resin was introduced thereto, and the resultant mixture was agitated by using a paint shaker (tungsten beads) for 2 hours to carry out dispersion, thereby preparing slurry for forming an inorganic coating layer having a solid content of 30 wt %. The weight ratio of the high-density particles, the low-density particles and the binder was 35:35:30. The slurry was applied to a separator substrate (polyethylene, available from Toray Co., thickness 9 μm, air permeation time 90 seconds/100 cc) and dried at a temperature of 80-90° C. to obtain a separator.

Example 2

First, alumina ($Al_2O_3$, $D_{50}$: 500 nm, density: 4 g/cm$^3$) as high-density particles and $Al(OH)_3$ ($D_{50}$: 800 nm, density: 2.4 g/cm$^3$) as low-density particles were introduced to water, styrene acrylate (gel content 98%, pH 3, $D_{50}$: 380 nm, density: 1.02 g/cm$^3$) as a binder resin was introduced thereto, and the resultant mixture was agitated by using a paint shaker (tungsten beads) for 2 hours to carry out dispersion, thereby preparing slurry for forming an inorganic coating layer having a solid content of 30 wt %. The weight ratio of the high-density particles, the low-density particles and the binder was 25:45:30. The slurry was applied to a separator substrate (polyethylene, available from Toray Co., thickness 9 μm, air permeation time 90 seconds/100 cc) and dried at a temperature of 80-90° C. to obtain a separator.

Example 3

First, alumina ($Al_2O_3$, $D_{50}$: 500 nm, density: 4 g/cm$^3$) as high-density particles and $Al(OH)_3$ ($D_{50}$: 800 nm, density: 2.4 g/cm$^3$) as low-density particles were introduced to water, styrene acrylate (gel content 98%, pH 3, $D_{50}$: 380 nm, density: 1.02 g/cm$^3$) as a binder resin was introduced thereto, and the resultant mixture was agitated by using a paint shaker (tungsten beads) for 2 hours to carry out dispersion, thereby preparing slurry for forming an inorganic coating layer having a solid content of 30 wt %. The weight ratio of the high-density particles, the low-density particles and the binder was 15:55:30. The slurry was applied to a separator substrate (polyethylene, available from Toray Co., thickness 9 μm, air permeation time 90 seconds/100 cc) and dried at a temperature of 80-90° C. to obtain a separator.

Example 4

First, alumina ($Al_2O_3$, $D_{50}$: 500 nm, density: 4 g/cm$^3$) as high-density particles and AlOOH ($D_{50}$: 200-300 nm, density: 3 g/cm$^3$) as low-density particles were introduced to water, styrene acrylate (gel content 98%, pH 3, $D_{50}$: 380 nm, density: 1.02 g/cm$^3$) as a binder resin was introduced thereto, and the resultant mixture was agitated by using a paint shaker (tungsten beads) for 2 hours to carry out dispersion, thereby preparing slurry for forming an inorganic coating layer having a solid content of 30 wt %. The weight ratio of the high-density particles, the low-density particles and the binder was 15:55:30. The slurry was applied to a separator substrate (polyethylene, available from Toray Co., thickness 9 μm, air permeation time 90 seconds/100 cc) and dried at a temperature of 80-90° C. to obtain a separator.

Comparative Example 1

First, alumina ($Al_2O_3$, $D_{50}$: 500 nm, density: 4 g/cm$^3$) and styrene acrylate (gel content 98%, pH 3, $D_{50}$: 380 nm, density: 1.02 g/cm$^3$) were introduced to water, and the resultant mixture was agitated by using a paint shaker (tungsten beads) for 2 hours to carry out dispersion, thereby preparing slurry for forming an inorganic coating layer having a solid content of 30 wt %. The weight ratio of the inorganic particles to the binder was 70:30. The slurry was applied to a separator substrate (polyethylene, available from Toray Co., thickness 9 μm, air permeation time 90 seconds/100 cc) and dried at a temperature of 80-90° C. to obtain a separator.

Comparative Example 2

First, AlOOH ($D_{50}$: 200-300 nm, density: 3 g/cm$^3$) and styrene acrylate (gel content 98%, pH 3, $D_{50}$: 380 nm, density: 1.02 g/cm$^3$) were introduced to water, and the resultant mixture was agitated by using a paint shaker (tungsten beads) for 2 hours to carry out dispersion, thereby preparing slurry for forming an inorganic coating layer having a solid content of 30 wt %. The weight ratio of the inorganic particles to the binder was 70:30. The slurry was applied to a separator substrate (polyethylene, available from Toray Co., thickness 9 μm, air permeation time 90 seconds/100 cc) and dried at a temperature of 80-90° C. to obtain a separator.

Comparative Example 3

First, $Al(OH)_3$ ($D_{50}$: 800 nm, density: 2.4 g/cm$^3$) and styrene acrylate (gel content 98%, pH 3, $D_{50}$: 380 nm, density: 1.02 g/cm$^3$) were introduced to water, and the resultant mixture was agitated by using a paint shaker (tungsten beads) for 2 hours to carry out dispersion, thereby preparing slurry for forming an inorganic coating layer having a solid content of 30 wt %. The weight ratio of the inorganic particles to the binder was 70:30. The slurry was applied to a separator substrate (polyethylene, available from Toray Co., thickness 9 μm, air permeation time 90 seconds/100 cc) and dried at a temperature of 80-90° C. to obtain a separator.

TABLE 1

| | Ex. 1 | Ex. 2 | Ex. 3 | Ex. 4 | Comp. Ex. 1 | Comp. Ex. 2 | Comp. Ex. 3 |
|---|---|---|---|---|---|---|---|
| Thickness (μm) | 15.2 | 15.3 | 15.2 | 15.2 | 15.2 | 15.3 | 14.9 |
| Inorganic coating layer loading amount (g/m$^2$) | 8.48 | 7.58 | 7.57 | 7.63 | 9.81 | 7.21 | 6.51 |
| Packing density (g/cm$^3$) | 1.3455 | 1.2226 | 1.2215 | 1.2301 | 1.582 | 1.144 | 1.147 |
| Gurley value (sec/100 cc) | 142 | 132 | 120 | 130 | 154 | 135 | 117 |
| Heat shrinkage (%) (MD/TD) | 10/5 | 15/10 | 12/10 | 10/5 | 8/5 | 16/16 | 24/18 |
| ER (Ω) | 1.2 | 0.9 | 0.83 | 0.93 | 1.67 | 1.1 | 0.75 |

TABLE 1-continued

| | Ex. 1 | Ex. 2 | Ex. 3 | Ex. 4 | Comp. Ex. 1 | Comp. Ex. 2 | Comp. Ex. 3 |
|---|---|---|---|---|---|---|---|
| Density ratio of binder resin to high-density inorganic particles | 0.25 | 0.25 | 0.25 | 0.25 | 0.25 | 0.31 | 0.42 |
| Density ratio of binder resin to low-density inorganic particles | 0.42 | 0.42 | 0.42 | 0.33 | — | — | — |

As can be seen from Table 1, each of the separators according to Examples 1-4 shows a higher packing density based on the inorganic coating layer loading amount of the separator, as compared to the separators according to Comparative Examples 2 and 3. Therefore, each separator shows excellent heat shrinking properties and an adequate resistance value. In the case of Comparative Example 1, it shows a higher packing density as compared to the separators according to Examples on the same thickness basis, but shows an excessively high Gurley value and resistance value. As a result, it is shown that the separator according to the present disclosure shows excellent characteristics in terms of Gurley value, heat shrinkage and resistance characteristics.

Test Methods

(1) Air Permeation Time (Gurley Value)

An air permeation time tester (EG01-55-1MR, available from Asahi Seiko) was used to determine the time (sec) required for 100 mL of air to pass through a separator under a constant pressure (0.05 MPa). The air permeation time was recorded as average of values determined at 3 points including 1 point of each of the left side/center/right side.

(2) Determination of Electrical Resistance

Each of the separators obtained from Examples and Comparative Examples was interposed between SUS sheets to form a coin cell. To prepare an electrolyte for the coin cell, ethylene carbonate and ethyl methyl carbonate were mixed at a volume ratio of 1:2, and $LiPF_6$ was added thereto at a concentration of 1 M. Each coin cell was determined in terms of electrical resistance by using a resistance analyzer (VMP3, Biologic science instrument) at 25° C. with an amplitude of 10 mV and a scan range of 0.1 Hz to 1 MHz through electrochemical impedance spectroscopy.

(3) Determination of Heat Shrinkage

Each of the separators obtained from Examples and Comparative Examples was cut into a size of 5 cm×5 cm to prepare a specimen, and each specimen was allowed to stand at 150° C. for 0.5 hours. Then, the length of each specimen after shrinking was compared with the initial length. The machine direction (MD) and the transverse direction (TD) were based on the separator substrate.

What is claimed is:

1. A separator for an electrochemical device, comprising:

a porous separator substrate; and a coating layer on at least one surface of the porous separator substrate, wherein the coating layer comprises first inorganic particles, second inorganic particles, and a particulate binder resin, wherein a ratio of a density of the particulate binder resin to a density of the first inorganic particles is equal to or more than 0.2 and less than 0.33, wherein a ratio of a density of the particulate binder resin to a density of the second inorganic particles ranges from 0.33 to 0.5, wherein the coating layer comprises a first layer adjacent to the porous separator substrate and a second layer on a surface of the first layer, wherein the first layer comprises at least some of the first inorganic particles, wherein the second layer comprises at least some of the second inorganic particles, wherein the second layer has a larger thickness as compared to the first layer, and wherein the second inorganic particles comprise at least one selected from the group consisting of aluminum hydroxide ($Al(OH)_3$) and $Mg(OH)_2$.

2. The separator for the electrochemical device according to claim 1, wherein the particulate binder resin has an average particle diameter ($D_{50}$) of 300 nm to 500 nm.

3. The separator for the electrochemical device according to claim 1, wherein the particulate binder resin comprises an acrylic binder resin.

4. The separator for the electrochemical device according to claim 1, wherein the particulate binder resin comprises styrene acrylate.

5. The separator for the electrochemical device according to claim 1, wherein the second inorganic particles have an average particle diameter ($D_{50}$) in a range of 500 nm to 1,000 nm, the first inorganic particles have an average particle diameter ($D_{50}$) in a range of 300 nm to 700 nm, and the first inorganic particles have a smaller average particle diameter ($D_{50}$) as compared to the average particle diameter ($D_{50}$) of the second inorganic particles.

6. The separator for the electrochemical device according to claim 1, wherein the first inorganic particles comprise at least one selected from the group consisting of boehmite (AlOOH), alumina ($Al_2O_3$) and $BaTiO_3$.

7. The separator for the electrochemical device according to claim 1, wherein an amount of the second inorganic particles is 40 wt % to 80 wt % based on 100 wt % of the inorganic particles in the coating layer.

8. The separator for the electrochemical device according to claim 1, wherein an amount of the second inorganic particles is 55 wt % to 80 wt % based on 100 wt % of the inorganic particles in the coating layer.

9. The separator for the electrochemical device according to claim 1, wherein the coating layer has pores from the interstitial volumes formed between the first inorganic particles, the second inorganic particles, and the particulate binder resin.

10. The separator for the electrochemical device according to claim 1, wherein the coating layer further comprises an electrode adhesive portion on a surface of the second layer, wherein the first layer comprises an amount of the first inorganic particles that is higher than an amount of the first inorganic particles present in the second layer or the electrode adhesive portion, wherein the second layer comprises an amount of the second inorganic particles that is higher than an amount of the second inorganic particles present in the first layer or the electrode adhesive portion, and wherein the electrode adhesive portion comprises an amount of the particulate binder resin that is higher than an amount of the particulate binder resin present in the first layer or the second layer.

11. A method for manufacturing the separator for the electrochemical device as defined in claim 1, comprising:

applying an aqueous slurry for forming the coating layer to the at least one surface of the porous separator substrate, followed by drying, wherein the aqueous slurry comprises the particulate binder resin, second inorganic particles and first inorganic particles and water as a solvent, and wherein the coating layer comprises a tri-layer structure comprising a first layer, a second layer and an electrode adhesive portion are formed by a difference in sedimentation rate, while the aqueous slurry is dried after being applied to the porous separator substrate.

12. The method for manufacturing the separator for the electrochemical device according to claim 11, wherein the aqueous slurry has a viscosity of 100 cp or less.

* * * * *